US012415466B2

(12) United States Patent
Gordon

(10) Patent No.: US 12,415,466 B2
(45) Date of Patent: Sep. 16, 2025

(54) VEHICLE RECOVERY EQUIPMENT STORAGE ARRANGEMENT

(71) Applicant: Jericho Offroad Pty Ltd, Brisbane (AU)

(72) Inventor: Hugh Douglas Gordon, Brisbane (AU)

(73) Assignee: Jericho Offroad Pty Ltd, Brisbane (AU)

(*) Notice: Subject to any disclaimer, the term of this patent is extended or adjusted under 35 U.S.C. 154(b) by 168 days.

(21) Appl. No.: 18/268,328

(22) PCT Filed: Dec. 22, 2021

(86) PCT No.: PCT/AU2021/051544
§ 371 (c)(1),
(2) Date: Jun. 20, 2023

(87) PCT Pub. No.: WO2022/133539
PCT Pub. Date: Jun. 30, 2022

(65) Prior Publication Data
US 2024/0034249 A1 Feb. 1, 2024

(30) Foreign Application Priority Data
Dec. 23, 2020 (AU) .............................. 2020904825

(51) Int. Cl.
*B60R 11/06* (2006.01)
*B60D 1/18* (2006.01)
*B60R 11/00* (2006.01)

(52) U.S. Cl.
CPC .............. *B60R 11/06* (2013.01); *B60D 1/187* (2013.01); *B60R 2011/004* (2013.01); *B60R 2011/0059* (2013.01); *B60R 2011/0071* (2013.01)

(58) Field of Classification Search
CPC ........................ B60R 11/06; B60R 2011/0071
(Continued)

(56) References Cited

U.S. PATENT DOCUMENTS 2,302,300 A * 11/1942 Davies ...................... B60R 9/02
224/571
3,947,927 A * 4/1976 Rosenthal ............ A63C 11/025
24/298
(Continued)

FOREIGN PATENT DOCUMENTS

AU 2004101009 A4 12/2004
AU 2012100267 A4 5/2012
(Continued)

OTHER PUBLICATIONS

International Preliminary Report on Patentability for corresponding Application No. PCT/AU2021/051544 dated Nov. 15, 2022, 6 pages.
(Continued)

*Primary Examiner* — Justin M Larson
(74) *Attorney, Agent, or Firm* — Taft Stettinius & Hollister LLP

(57) ABSTRACT

Disclosed herein is a mounting arrangement for securing vehicle recovery equipment to a vehicle. The mounting arrangement comprises a strap extending between a free end and a securable end and the strap is secured to the anchor system at or proximal to the securable end. The free end extends around at least a part of the vehicle recovery equipment to retain the vehicle recovery equipment. The mounting arrangement also comprises a releasable connector for securing towards or proximal the free end of the strap. Loosening of the releasable connector deploys the vehicle recovery equipment. The mounting arrangement comprises an anchor system comprising an anchor strap extending around a part of the vehicle allowing the anchor system to be mounted at different parts of the vehicle. Also disclosed is a method for mounting the vehicle recovery equipment to a vehicle.

17 Claims, 17 Drawing Sheets

(58) Field of Classification Search
USPC .............................. 224/482, 543, 546, 563
See application file for complete search history.

(56) References Cited

U.S. PATENT DOCUMENTS

| | | | |
|---|---|---|---|
| 4,108,342 A * | 8/1978 | Riva ..................... | B60P 7/0807 224/571 |
| 4,596,348 A * | 6/1986 | Stamp ...................... | B60R 9/02 224/563 |
| 4,951,910 A * | 8/1990 | March ................... | B60N 3/106 248/205.2 |
| 5,058,243 A | 10/1991 | Rasmussen | |
| 5,215,325 A | 6/1993 | Novotny et al. | |
| 5,279,432 A | 1/1994 | Pryor | |
| 5,308,101 A | 5/1994 | Monty | |
| 5,443,225 A | 8/1995 | Tracy et al. | |
| 5,730,346 A | 3/1998 | Adams et al. | |
| 6,092,826 A | 7/2000 | Pingel et al. | |
| 6,695,556 B2 | 2/2004 | Addy | |
| 6,789,671 B2 | 9/2004 | Morrison et al. | |
| 6,892,912 B1 * | 5/2005 | MacNeil ................ | B60R 9/055 224/572 |
| 6,978,918 B2 * | 12/2005 | Scanlan ................ | A45C 13/30 224/563 |
| 8,079,116 B2 * | 12/2011 | Ayers .................... | B60P 7/0869 383/902 |
| 8,132,302 B2 | 3/2012 | Wilkinson | |
| 8,276,795 B1 * | 10/2012 | Dean ....................... | F42B 39/22 224/543 |
| 9,302,606 B2 * | 4/2016 | Danze ................... | B60P 7/0823 |
| 10,981,521 B2 * | 4/2021 | Creely ..................... | F16B 2/08 |
| 2004/0238707 A1 | 12/2004 | Yaokum, Jr. | |
| 2006/0213942 A1 * | 9/2006 | Gomez ................... | B60R 11/00 224/532 |
| 2014/0224851 A1 | 8/2014 | Hancock et al. | |
| 2015/0054257 A1 | 2/2015 | Livingstone et al. | |
| 2015/0136626 A1 | 5/2015 | Hagan et al. | |
| 2016/0297265 A1 | 10/2016 | Sparkes | |
| 2017/0087946 A1 | 3/2017 | Fincher | |
| 2018/0208006 A1 | 7/2018 | Farooq et al. | |
| 2019/0126698 A1 | 5/2019 | Russell et al. | |
| 2020/0208714 A1 | 7/2020 | Ferris | |
| 2020/0324714 A1 | 10/2020 | Ziaylek | |
| 2024/0034249 A1 * | 2/2024 | Gordon ................... | B60R 11/06 |

FOREIGN PATENT DOCUMENTS

| | | |
|---|---|---|
| AU | 2014271240 A1 | 7/2015 |
| AU | 2016100658 A4 | 6/2016 |
| AU | 2020200364 B1 | 12/2020 |
| CN | 207374044 U | 5/2018 |
| CN | 210760112 U | 6/2020 |
| DE | 2753666 A1 | 7/1979 |
| DE | 4008467 A1 | 9/1991 |
| GB | 2237548 B | 5/1991 |
| GB | 2559551 A | 8/2018 |
| WO | 2019140173 A1 | 7/2019 |

OTHER PUBLICATIONS

Written Opinion for corresponding Application No. PCT/AU2021/051544 dated Mar. 16, 2022, 7 pages.
International Preliminary Report on Patentability for corresponding Application No. PCT/AU2021/051544 dated Jun. 9, 2023, 6 pages.
European Patent Office, Extended European Search Report issued in corresponding Application No. 21908151.0, dated Oct. 10, 2024, 8 pp.
Saudi Arabian Patent Office, Examination Report issued in corresponding Application No. 523441296, dated Nov. 1, 2024, 16 pp.

* cited by examiner

VEHICLE RECOVERY EQUIPMENT STORAGE ARRANGEMENT

CROSS REFERENCE TO RELATED APPLICATIONS

This is a U.S. National Stage application of, and claims priority to, PCT/AU2021/051544, filed Dec. 22, 2021, which further claims priority to AU patent application s/n 2020904825, filed Dec. 23, 2020, the contents of each is incorporated herein by reference in its entirety.

TECHNICAL FIELD

This disclosure relates to a mounting arrangement for securing vehicle recovery equipment to a vehicle.

BACKGROUND ART

Vehicles, for example four-wheel drive vehicles, can get stuck or bogged for a variety of reasons, such as wet terrain, steep track, deep mud, and a broken-down vehicle. Disabled and stuck vehicles for an extended period of time can cause damage to the vehicle and be potentially dangerous for the driver if they are stuck in a remote location without any recourse. Recovery equipment assists in recovering the disabled vehicle. Recovery equipment can include straps, winches, dampers, shackles and grapple hooks among other types of equipment. Typically, the recovery equipment is stored in a bag and kept inside the vehicle, or the looped recovery straps are hung over existing radio antenna or on the front bar/bull-bar of the car just before heading out onto some anticipated difficult terrain. The recovery equipment is attached to a recovery point on the vehicle at one end and either a nearby tree or another vehicle at the other end. Some problems may be the recovery point may be inaccessible, the recovery equipment may be lost, the tree may not be strong enough or another vehicle may not be present. This leaves the vehicle vulnerable to damage for potentially a long time.

It is to be understood that, if any prior art is referred to herein, such reference does not constitute an admission that the prior art forms a part of the common general knowledge in the art, in Australia or any other country.

SUMMARY

According to an aspect, disclosed is a mounting arrangement for securing vehicle recovery equipment to a vehicle, the mounting arrangement comprising an anchor system configured to be coupled to a vehicle, a strap extending between a securable end and a free end, the strap being secured to the anchor system proximal to or at the securable end, and a releasable connector including degrees of movement to allow the releasable connector to extend relative to the anchor system at a range of angles for securing the strap towards or proximal the free end of the strap, wherein, when the mounting arrangement is a retained position, the strap being arranged to extend around at least a part of the vehicle recovery equipment to retain the vehicle recovery equipment to the vehicle, and when the mounting arrangement is in a deployed position, the releasable connector is released to loosen the strap to deploy the vehicle recovery equipment.

It is understood that "strap" may include rope, cable, chain or any suitable type of elongate strong material that is able to secure and retain the vehicle recovery equipment to the vehicle. The strap may be formed of nylon polyamide webbing and PV matting. Other materials may be used such as Polyethylene or any rubber or crude oil derivative or Polyethylene or any rubber or crude oil derivative or any suitable material that is durable, and flexible and allows the device to perform as described.

Quick access to pre-deployed recovery equipment decreases recovery time of the vehicle and lowers the likelihood of damage of the vehicle.

In some embodiments, the releasable connector includes a buckle releasably connectable to the free end of the strap. The releasable connector is quick release and only a single point of contact for the operator. In some embodiments, the securable end of the strap is threaded through the releasable connector to attach the releasable connector to the anchor system.

In some embodiments, the releasable connector is attached to or proximal to the securable end of the strap.

In some embodiments, the mounting arrangement further includes an attachment member. The attachment member may be in the form of a ring. Both the attachment member and the buckle are attached to or proximal to the securable end of the strap. The attachment of the releasable connector includes degrees of movement to allow both the buckle and the ring to extend relative to the attachment point at a range of angles independently of one another. In this way the strap can accommodate the recovery equipment in different positions and at different attachment positions on the vehicle while maintaining a secure connection at the releasable connector.

In some embodiments, the anchor system includes one or more anchor straps fixed to a mounting pad, and the one or more anchor straps are at least secured to the mounting pad at a plurality of peripheral points.

In some embodiments, the plurality of secured peripheral points are spaced apart to define a passage in at least one direction, and the mounting arrangement further comprises a securement strap extending through the passage to secure the mounting arrangement to the vehicle. In some embodiments, the one or more anchor straps are in the form of two anchor straps, and the passage is defined between the anchor straps.

In some embodiments, the anchor system further comprises a second anchor strap fixed to the one or more anchor straps at a plurality of peripheral points to define a second passage in at least one direction for receiving the securement strap to secure the mounting arrangement to the vehicle. In some embodiments, the second passage is defined between the second anchor strap and the one or more anchor straps.

In some embodiments, the second passage is substantially perpendicular to the passage.

The securement strap is movable and may be mounted to different places on the vehicle as required. In this way, the securement strap may utilise the passage or the second passage or a combination thereof as required by the mounting position on the vehicle.

In some embodiments, the mounting pad includes a rear face that is mountable in facing arrangement with the vehicle. The mounting pad may be non-abrasive to prevent damage to the vehicle when the anchor system is coupled to the vehicle. The mounting pad also prevents damage to vehicle from movement of the vehicle recovery equipment.

In some embodiments, the mounting arrangement further comprises an attachment member secured to the anchor system for defining at least one loop of the strap extending around a part of the vehicle recovery equipment. In some embodiments, the attachment member defines two loops of the strap, wherein a first loop extends around a part of the vehicle recovery equipment and a second loop extends around a further part of the vehicle recovery equipment. This allows for secure storage and single touch release of the vehicle recovery equipment.

According to a further aspect, disclosed is a mounting arrangement for securing vehicle recovery equipment to a vehicle, the mounting arrangement including an anchor system configured to be coupled to the vehicle, a strap extending between a free end and a securable end, the strap being secured to the anchor system at or proximal to the securable end, and the free end extends around at least a part of the vehicle recovery equipment to retain the vehicle recovery equipment, the anchor system including an anchor strap extending around a part of the vehicle, wherein the anchor system is reconfigurable to be mounted to a plurality of different parts of the vehicle.

In some embodiments, the anchor system includes one or more anchor straps fixed to a mounting pad, and the one or more anchor straps are at least secured to the mounting pad at a plurality of peripheral points.

In some embodiments, the plurality of secured peripheral points are spaced apart to define a passage in at least one direction, and the mounting arrangement further comprises a securement strap extending through the passage to secure the mounting arrangement to the vehicle. In some embodiments, the one or more anchors straps are in the form of two anchor straps, and the passage is defined between the anchor straps.

In some embodiments, the anchor system further comprises a second anchor strap fixed to the one or more anchor straps at a plurality of peripheral points to define a second passage in at least one direction for receiving the securement strap to secure the mounting arrangement to the vehicle. In some embodiments, the second passage is defined between the second anchor strap and the one or more anchor straps.

In some embodiments, the second passage is substantially perpendicular to the passage.

The configuration of the passages and the securement strap(s) allows the mounting arrangement to be mounted in different places on the vehicle. One securement strap may be employed or one in each passage depending on the requirements of the mounting position. Further, more than one securement strap may be employed in any one passage.

In some embodiments, the mounting pad includes a rear face that is mountable in facing arrangement with the vehicle. The mounting pad may be non-abrasive to prevent damage to the vehicle when the anchor system is coupled to the vehicle. The mounting pad also may prevent damage to the vehicle from the vehicle recovery equipment.

In some embodiments, the mounting arrangement further comprises a releasable connector for securing towards or proximal the free end of the strap, wherein, when the mounting arrangement is in a retained position, the strap being arranged to extend around at least a part of the vehicle recovery equipment to retain the vehicle recovery equipment to the vehicle, and when the mounting arrangement is in a deployed position, the releasable connector is released to at least partially release the strap to deploy the vehicle recovery equipment.

In some embodiments, the releasable connector includes a buckle releasably connectable to the free end of the strap. The releasable connector allows fast deployment of the recovery equipment.

In some embodiments, the releasable connector is attached to or proximal to the securable end of the strap.

In some embodiments, the securable end of the strap is threaded through the releasable connector to attach the releasable connector to the anchor system.

In some embodiments, the mounting arrangement further comprises an attachment member secured to the anchor system for defining at least one loop of the strap extending around a part of the vehicle recovery equipment. In some embodiments, the attachment member defines the strap into two loops, wherein a first loop extends around a part of the vehicle recovery equipment and a second loop extends around a further part of the vehicle recovery equipment. This allows for secure storage and single touch release of the vehicle recovery equipment.

According to a further aspect, disclosed is a mounting arrangement for securing vehicle recovery equipment to a vehicle, the mounting arrangement comprising an anchor system configured to be coupled to the vehicle, a strap extending between a securable end and a free end, the strap being secured to the anchor system proximal to or at the securable end; a releasable connector for securing towards or proximal the free end of the strap; and an attachment member secured to the anchor system for defining at least one loop of the strap extending around a part of the vehicle recovery equipment.

In some embodiments, the attachment member defines the straps into two loops, wherein a first loop extends around a part of the vehicle recovery equipment and a second loop extends around a further part of the vehicle recovery equipment. The combination of the first and second loops of the strap, the attachment member and the releasable fastener allow for secure and stable storage and mounting of the vehicle recovery equipment and single touch release of the recovery equipment. According to a further aspect, disclosed is a mounting arrangement for securing vehicle recovery equipment to a vehicle, the mounting arrangement comprising an anchor system configured to be coupled to a vehicle; a strap being movable relative to a releasable connector between a retained position and a deployed position, wherein in the retained position, the strap extends around at least a part of the vehicle recovery equipment to retain the vehicle recovery equipment to the anchor system, and in a deployed position, the releasable connector is configured to at least partially release the strap to disengage the vehicle recovery equipment; and a deployment strap configured to facilitate the disengagement of the vehicle recovery equipment to apply a force to a part of the strap to facilitate at least partial release of the strap relative to the releasable connector to the deployed position. Advantageously, the deployment strap can increase leverage to apply the force to a part of the strap to facilitate at least partial release of the strap when the releasable connector is in the deployed position.

In some embodiments, the deployment strap can extend between a first end and a second end and includes a coupling portion located between or at the first end and second end configured to couple with at least a part of the strap, and wherein, when the releasable connector is released, a force is applied to the second end of the deployment strap to at least partially release the strap from the releasable connector to deploy the vehicle recovery equipment. Such a coupling portion is advantageous in facilitating the effective transfer of any applied force from the deployment strap to the part of the strap to facilitate at least a partial release.

In some embodiments, the coupling portion of the deployment strap comprises a first loop, the first loop being located at or proximal to the first end, and the coupling portion further comprises a second loop located between the first end and the second end wherein the first loop is coupled to at least part of the vehicle recovery equipment and the second loop receives the strap. The use of such loops offers a simple system that facilitates easy coupling of the deployment strap with a portion of the strap by a user.

According to a further aspect, disclosed is a method of mounting vehicle recovery equipment to a vehicle, the method including:
 coupling a mounting arrangement to the vehicle, the mounting arrangement including a strap extending around at least a part of the vehicle recovery equipment to retain the vehicle recovery equipment, the strap being fixed to an anchor system;
 extending a securement strap through the anchor system;
 extending the securement strap around a part of the vehicle;
 fastening the securement strap to the vehicle via a releasable fastener;
 wherein the mounting arrangement including the vehicle recovery equipment is configured to be mounted in different parts of the vehicle.

In some embodiments, the mounting arrangement includes a strap extending between a free end and a securable end, the securable end is fixed to the anchor system, and the free end extends around at least a part of the vehicle recovery equipment to retain the vehicle recovery equipment. In some embodiments, the mounting arrangement includes a releasable connector to releasably secure the vehicle recovery equipment, and the free end of the strap is securable to the releasable connector to retain the vehicle recovery equipment.

In some embodiments, the anchor system includes one or more anchor straps fixed to a mounting pad, and the one or more anchor straps are at least secured to the mounting pad at a plurality of peripheral points.

In some embodiments, the plurality of secured peripheral points are spaced apart to define a passage in at least one direction, and the method further comprises extending a securement strap through the passage to secure the mounting arrangement to the vehicle. In some embodiments, the one or more anchor straps are in the form of two anchor straps and the passage is defined between the anchor straps.

In some embodiments, the anchor system further comprises a second anchor strap fixed to the one or more anchor straps at a plurality of peripheral points spaced apart to define a second passage in at least one direction, and the method further comprising extending the securement strap in the second passage to secure the mounting arrangement to the vehicle.

In some embodiments, the second passage is substantially perpendicular to the passage.

In some embodiments, the method further comprises mounting a rear face of the mounting pad includes in facing arrangement with the vehicle.

In some embodiments, the mounting pad is non-abrasive to prevent damage to the vehicle.

According to a further aspect, disclosed is a method of mounting vehicle recovery equipment to a vehicle, the method including:
 coupling an anchor system of a mounting arrangement to the vehicle, the mounting arrangement including a strap extending between a free end and a securable end, the securable end is fixed to the anchor system,
 extending the free end of the strap around at least a part of the vehicle recovery equipment to retain the part of the vehicle recovery equipment,
 extending the strap through an attachment member secured to the anchor system to define a first loop of the strap extending around the part of the vehicle recovery equipment,
 extending the strap from the attachment member around a further part of the vehicle recovery equipment to define a second loop of the strap and securing the free end of the strap at a releasable connector,
 wherein the first loop and the second loop secure the vehicle recovery equipment to the mounting arrangement by providing balanced and tensioned points of contact relative to the recovery equipment.

According to a further aspect, disclosed is a method of mounting vehicle recovery equipment to a vehicle, the method including:
 coupling a mounting arrangement to the vehicle, the mounting arrangement including a strap extending around at least a part of the vehicle recovery equipment to retain the vehicle recovery equipment, the strap being fixed to an anchor system and movable relative to a releasable connector, the mounting arrangement further comprising a deployment strap configured to facilitate disengagement of the vehicle recovery equipment;
 extending a securement strap through the anchor system;
 extending the securement strap around a part of the vehicle;
 fastening the securement strap to the vehicle via a releasable fastener;
 wherein the mounting arrangement including the vehicle recovery equipment is configured to be mounted to different parts of the vehicle.

According to a further aspect, disclosed is a method of mounting vehicle recovery equipment to a vehicle, the method including:
 coupling an anchor system of a mounting arrangement to the vehicle, the mounting arrangement including a strap extending between a free end and a securable end, the securable end being fixed to the anchor system;
 extending the free end of the strap around at least a part of the vehicle recovery equipment to retain the part of the vehicle recovery equipment;
 extending the strap through an attachment member secured to the anchor system to define a first loop of the strap extending around the part of the vehicle recovery equipment;
 extending the strap from the attachment member around a further part of the vehicle recovery equipment to define a second loop of the strap;
 coupling the strap with a deployment strap configured to facilitate disengagement of the vehicle recovery equipment prior to securing it to a releasable connector,
 wherein the first loop and the second loop secure the vehicle recovery equipment to the mounting arrangement by providing balanced and tensioned points of contact relative to the recovery equipment.

According to a further aspect, disclosed is a method of dismounting a vehicle recovery secured to a vehicle using a mounting arrangement comprising an anchor system, a strap being movable relative to a releasable connector and extending around at least a part of the vehicle recovery equipment to retain the vehicle recovery equipment to the anchor system and a deployment strap configured to facilitate the disengagement of the vehicle recovery equipment, the method comprising:
 operating the releasable connector to at least partially release the strap to disengage the vehicle recovery equipment;
 applying a force to a part of the strap through the deployment strap to facilitate at least partial release of the strap relative to the releasable connector.

BRIEF DESCRIPTION OF THE DRAWINGS

Embodiments will now be described by way of example only, with reference to the accompanying drawings in which.

DETAILED DESCRIPTION

Figure 1:
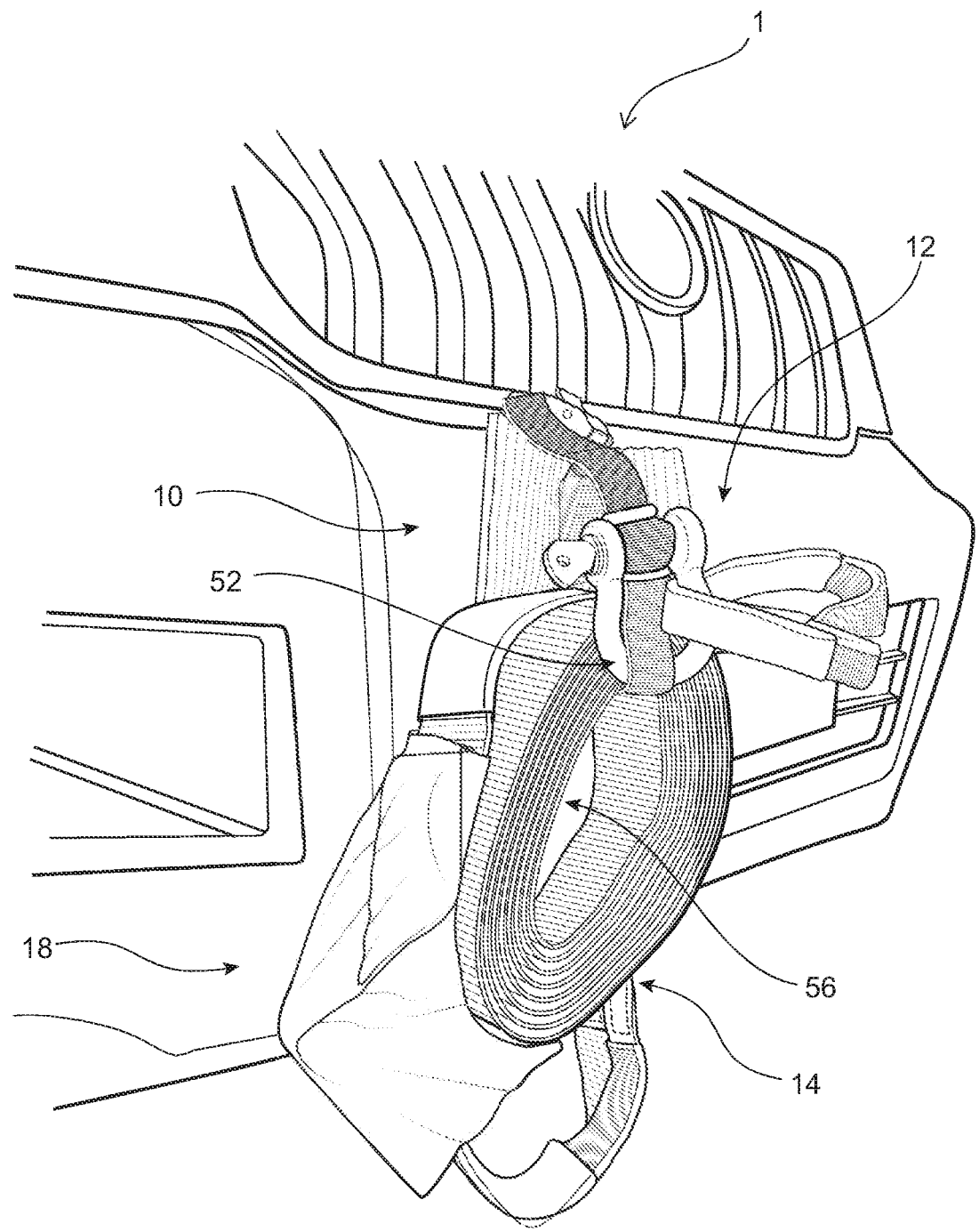
FIG. 1 is a perspective view of an embodiment of a vehicle including a mounting arrangement and vehicle recovery equipment.

In the following detailed description, reference is made to accompanying drawings which form a part of the detailed description. The illustrative embodiments described in the detailed description, depicted in the drawings and defined in the claims, are not intended to be limiting. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

Disclosed is embodiments of a mounting arrangement 10 for securing vehicle recovery equipment 12 to a vehicle. Embodiments of the mounting arrangement may provide secure storage and mounting of the recovery equipment 12 to the vehicle for reliable, easy and quick access during emergency circumstances, such as getting stuck or bogged in wet terrain or mud. The mounting arrangement 10 may be mounted to a four-wheel drive vehicle and thus the expected off-roading environment is typically rugged, sandy, rocky, wet and muddy terrain. However, the mounting arrangement 10 is not restricted to use on a four-wheel drive vehicle and can be used in relation to any vehicle. The disclosed mounting arrangement may have a load carrying capability of about 10-20 kg. However, it will be appreciated that by careful selection of materials and variation of other parameters of the current arrangement, this load carrying capability can be varied.

Figure 2:
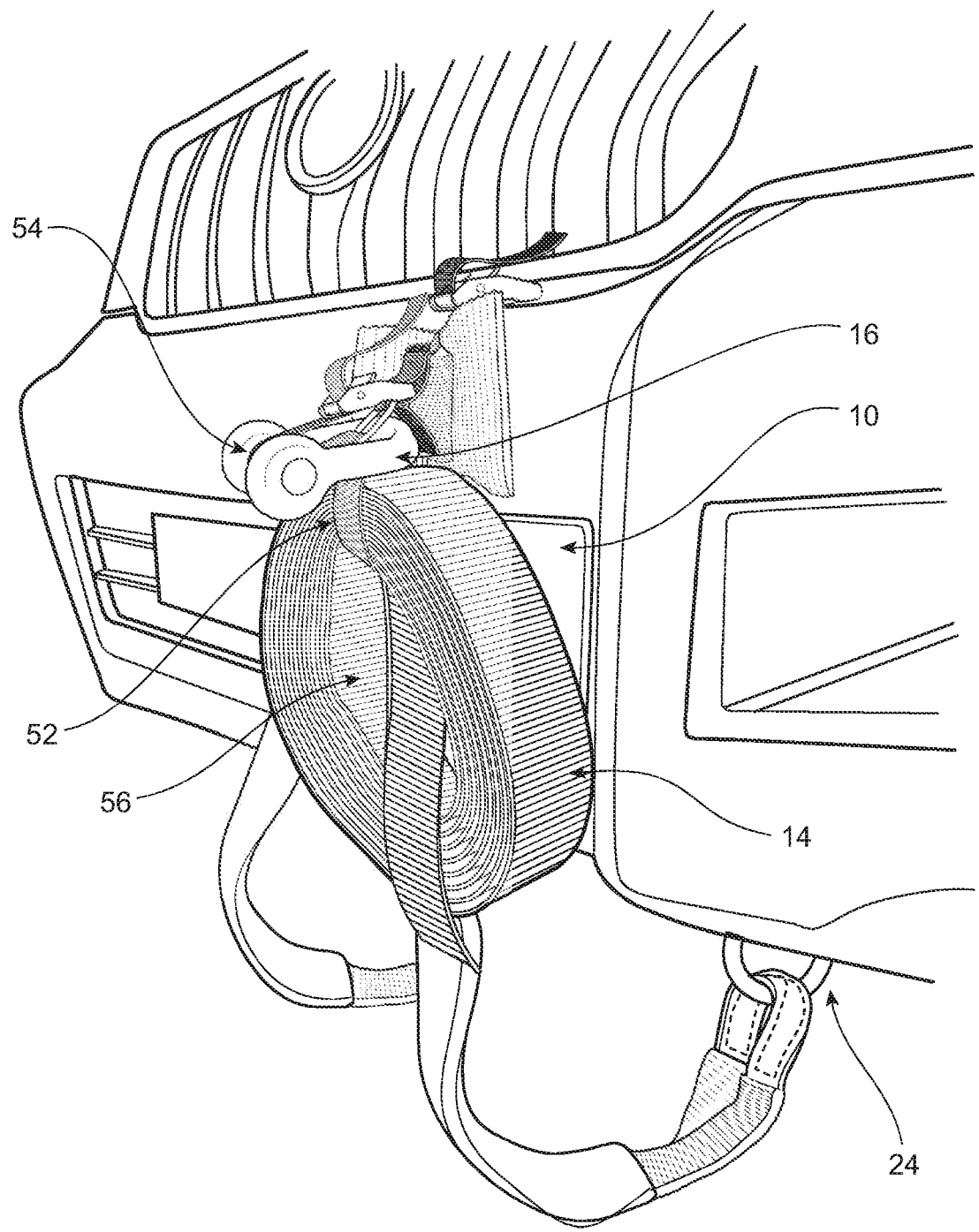
FIG. 2 is a perspective view of the vehicle of FIG. 1 including the mounting arrangement and vehicle recovery equipment.
Figure 3:
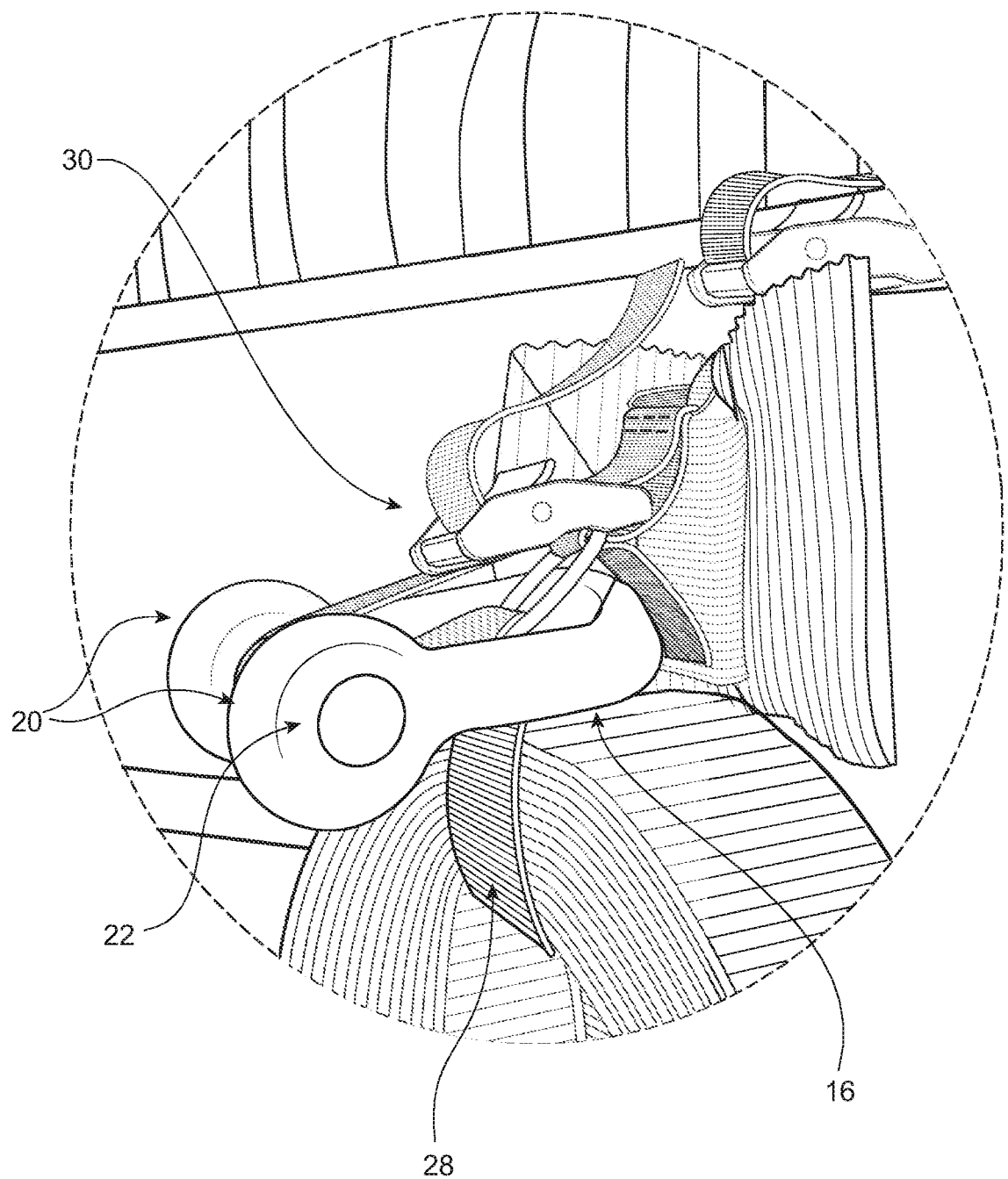
FIG. 3 is a close-up perspective view of the mounting arrangement on the vehicle of FIG. 1.

FIGS. 1 to 3 illustrate an embodiment of the mounting arrangement 10 coupled to a vehicle 1 and including recovery equipment 12. In the illustrated embodiment, the recovery equipment 12 includes a coiled recovery strap 14, a shackle 16 and a recovery damper 18 retained by the mounting arrangement. The recovery equipment 12 is mounted to a front portion of the vehicle 1. The shackle 16 includes a bow (the U-shaped component) ending in aligned ears 20. A pin 22 extends through the aligned ears 20 for locking the shackle 16 to the recovery point on the vehicle. In alternative embodiments, the recovery equipment 12 may include winches, grapples etc. and may be mounted on any other type of vehicle, for example, a truck or a minivan etc. In alternative embodiments, the mounting arrangement 10 could also be used to mount the recovery equipment 12 to a different part of the front portion, side or rear portions of a vehicle as well as a roof rack.

One or more ends of the recovery strap 14 are secured to one or more vehicle recovery points 24 located underside of the vehicle. The other end(s) of the strap 14 may be secured to another vehicle or a tree in use and when stored is secured to the coiled strap 14. Such an arrangement eliminates the need for the strap 14 to be secured to the vehicle recovery point(s) 24 during the recovery process.

The mounting arrangement 10 comprises an anchor system 26, a strap 28, and a releasable connector 30. There are two primary functions of the mounting arrangement 10: 1) to retain or store the recovery equipment 12 and 2) to secure or couple the recovery equipment 12 to the vehicle 1. The anchor system 26 enables the mounting arrangement 10 and its various components to be coupled to the vehicle 1. The retaining function will be discussed first in relation to FIGS. 4 to 7 and then the securing function will be discussed in relation to FIGS. 8 to 14.

Now referring to FIGS. 4 to 7, the mounting arrangement 10 includes the strap 28 extending between a securable end 32 and a free end 34. The strap 28 is secured to the anchor system 26 proximal or at the securable end 32. An end 36 of the securable end 32 of the strap 28 is secured to the anchor system 26 at peripheral points. In the illustrated embodiment, the end 36 of the securable end 32 is sewn along its end peripheral edge. The strap 28 proximal the securable end 32 forms a connector loop 38 which extends through the releasable connector 30 and is fixed at joint 40 which overlies the fixed end of the securable strap and a portion of the anchor system 26. The connector loop 38 retains the releasable connector 30 relative to the mounting arrangement 10 and allows some degree of movement of the releasable connector 30. The strap 28 is secured (e.g. sewn) at joint 42 before extending under the releasable connector 30, the connector loop 38 and a part of the anchor system 26.

Figure 4:
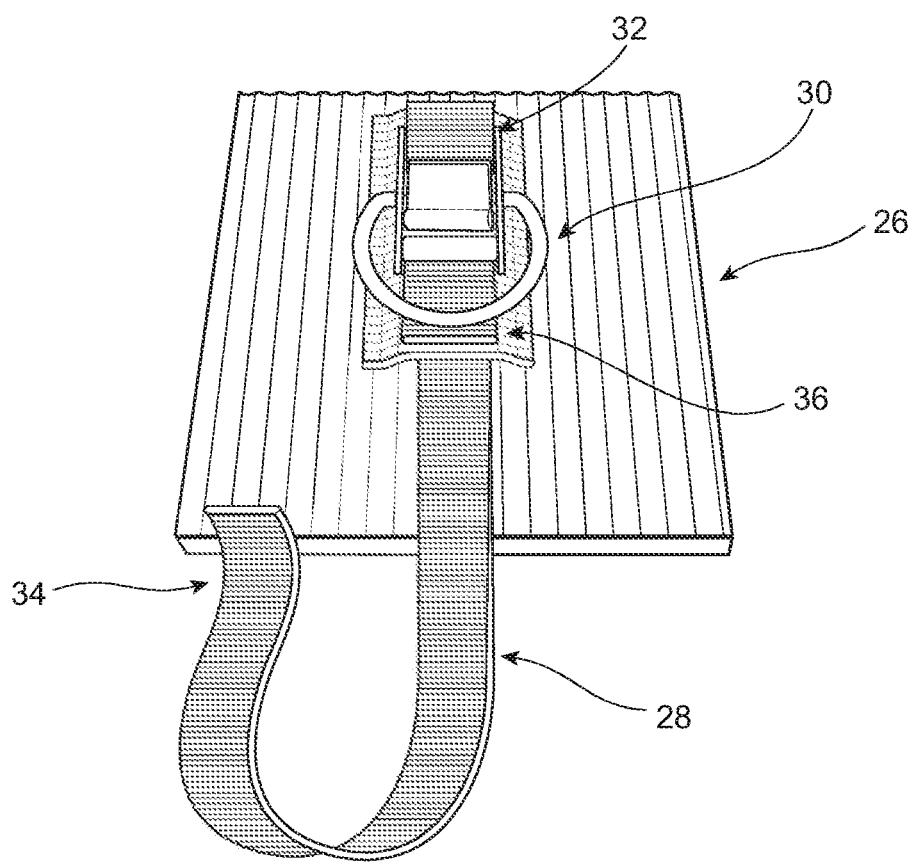
FIG. 4 is a perspective view of an embodiment of the mounting arrangement of FIG. 1 not secured to a vehicle.
Figure 5:
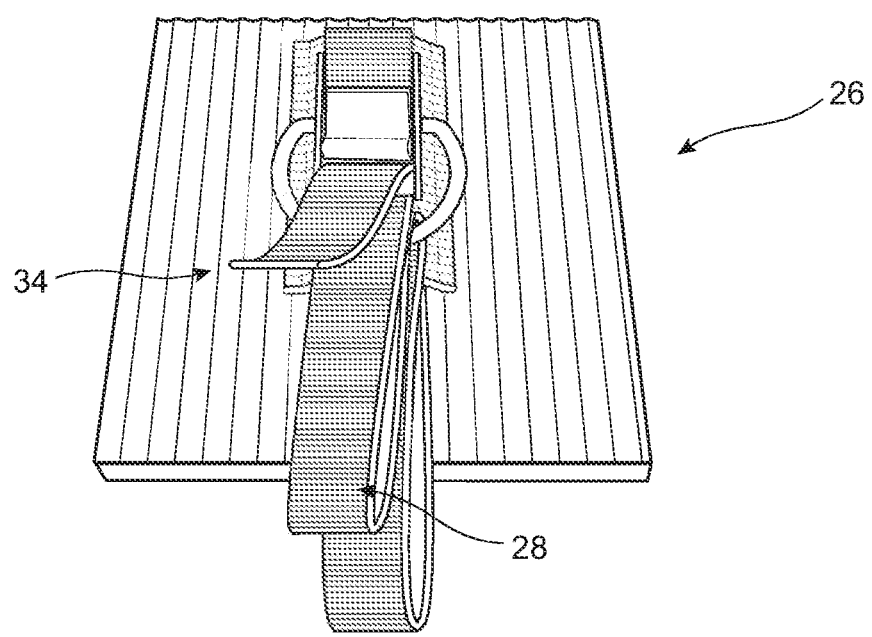
FIG. 5 is a plan view of the mounting arrangement of FIG. 4.

The releasable connector 30 includes a buckle 44 and the mounting arrangement 10 further includes an attachment member 46 in the form of a ring. The ring 46 and the buckle 44 each include at least one aperture for receiving the strap 28 to be secured to the anchor system. The strap 28 passes through the at least one aperture of each of the ring and the buckle. The releasable connector 30 secures the free end 34 of the strap and releases the free end 34 of the strap between a retained position (FIG. 5) and a deployed position (FIG. 4). In the retained position, the strap 28 is arranged to extend around at least a part of the vehicle recovery equipment 12 to retain the vehicle recovery equipment 12. In the deployed position, the releasable connector 30 is released to loosen, in some embodiments, disconnect the free end 34 of the strap 28 from the releasable connector 30, to deploy the vehicle recovery equipment 12.

The buckle 44 includes a cam lock fastener 48 and a release lever 50. The cam lock fastener 48 locks the buckle 44 to secure the strap 28 in the retained position. The release lever 50 is quickly released to deploy the vehicle recovery equipment 12 in the deployed position.

Figure 6:
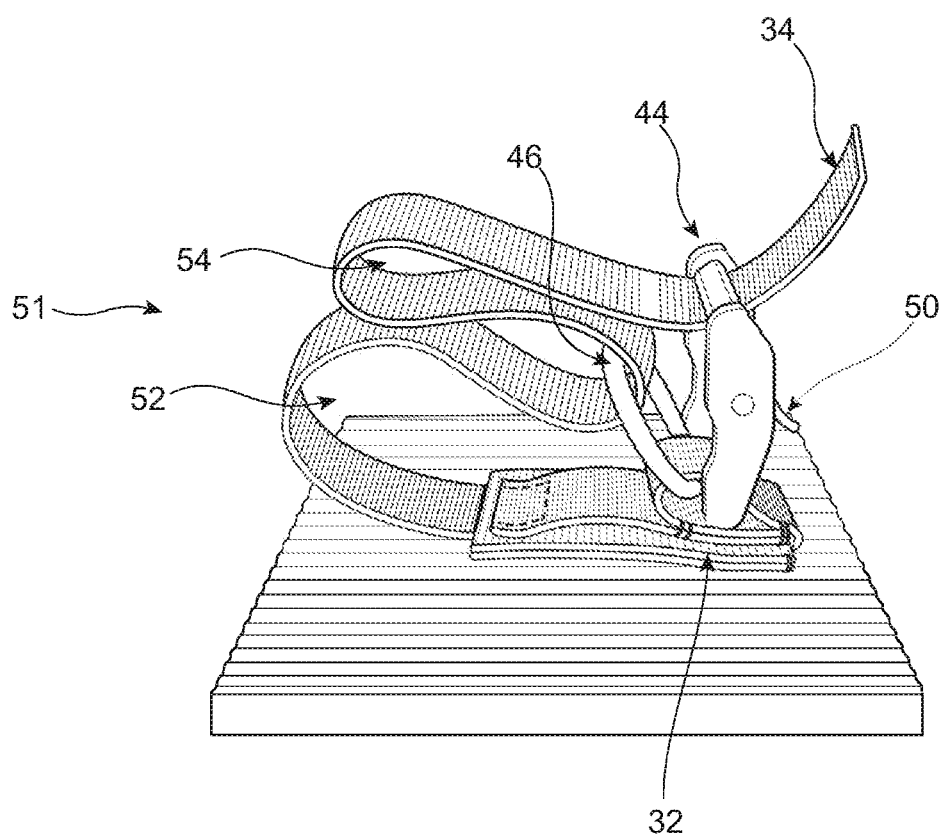
FIG. 6 is a side view of the mounting arrangement of FIG. 4.
Figure 7:
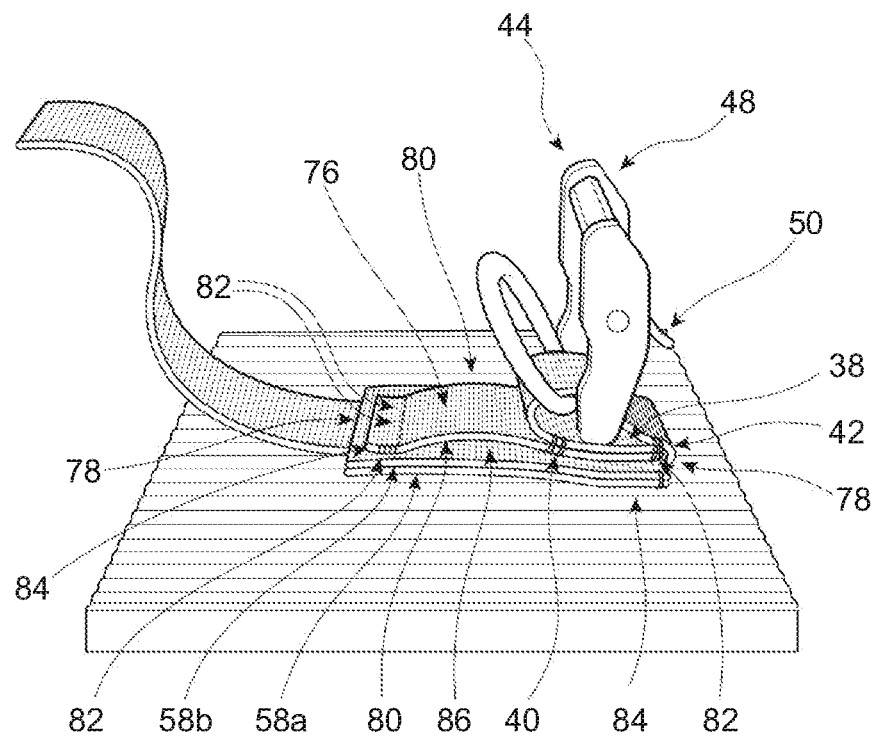
FIG. 7 is a close-up side view of the mounting arrangement of FIG. 4.
Figure 8:
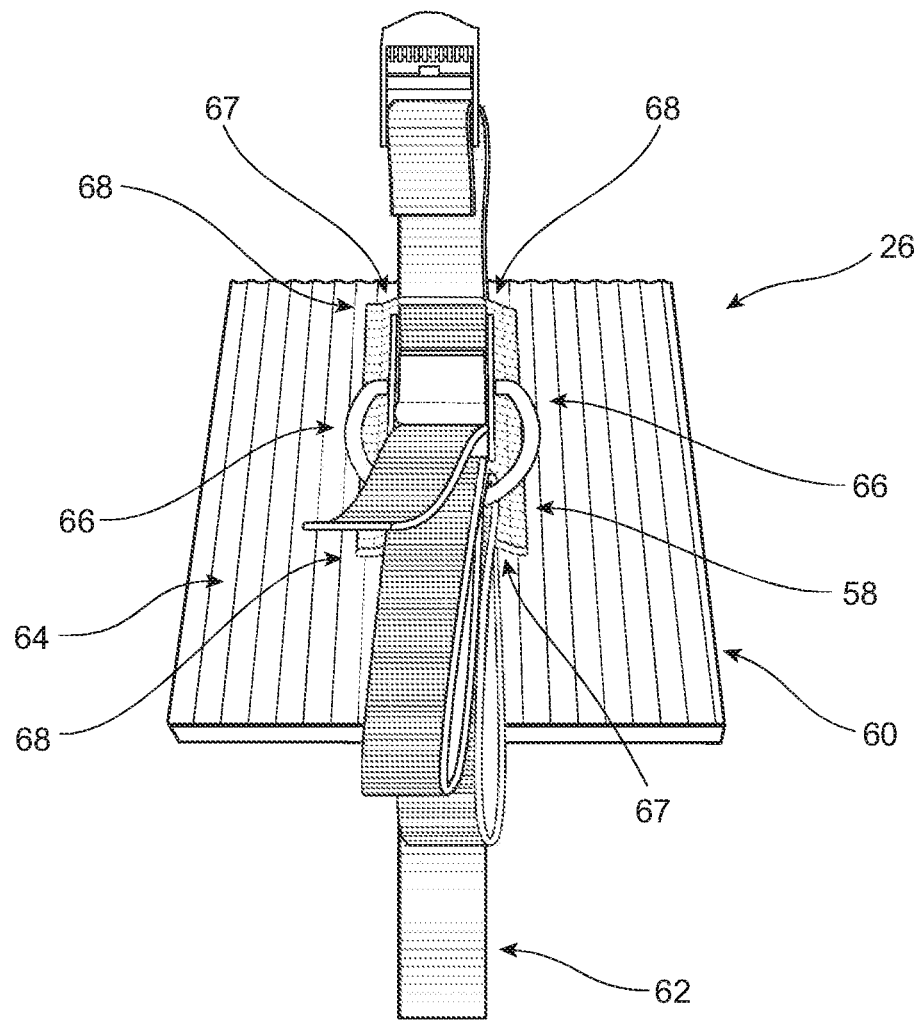
FIG. 8 is a perspective view of the mounting arrangement of FIG. 4 including an embodiment of a securement strap.
Figure 9:
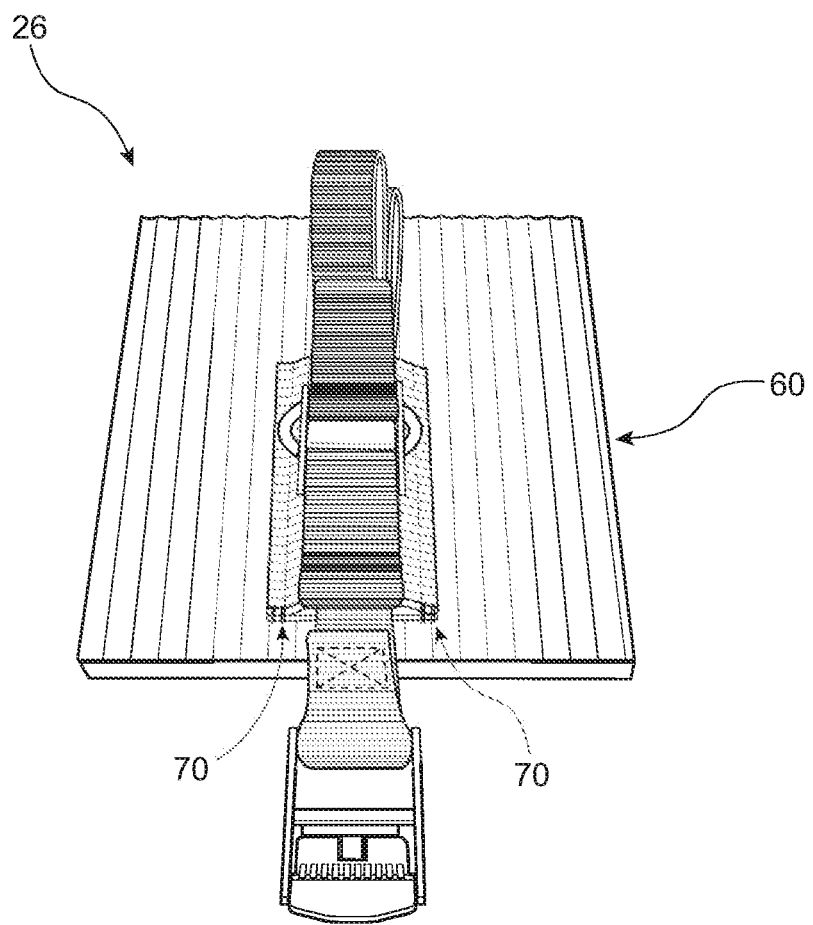
FIG. 9 is a perspective view of the mounting arrangement of FIG. 8.
Figure 10:
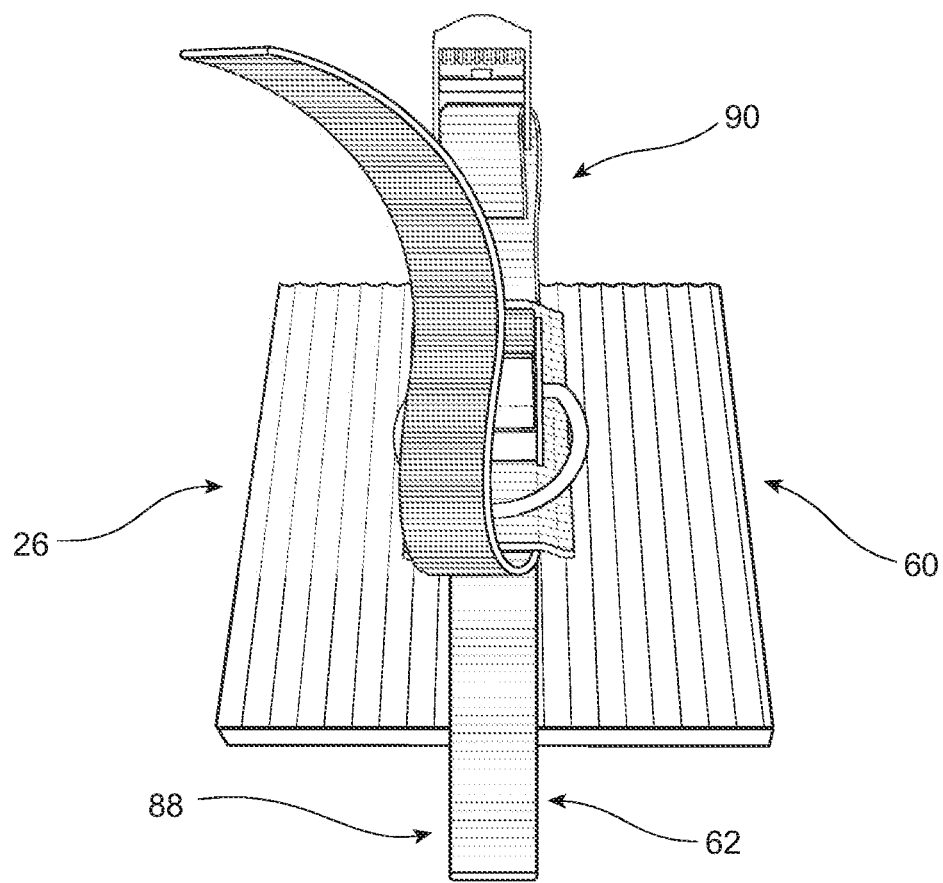
FIG. 10 is a perspective view of the mounting arrangement of FIG. 8.
Figure 11:
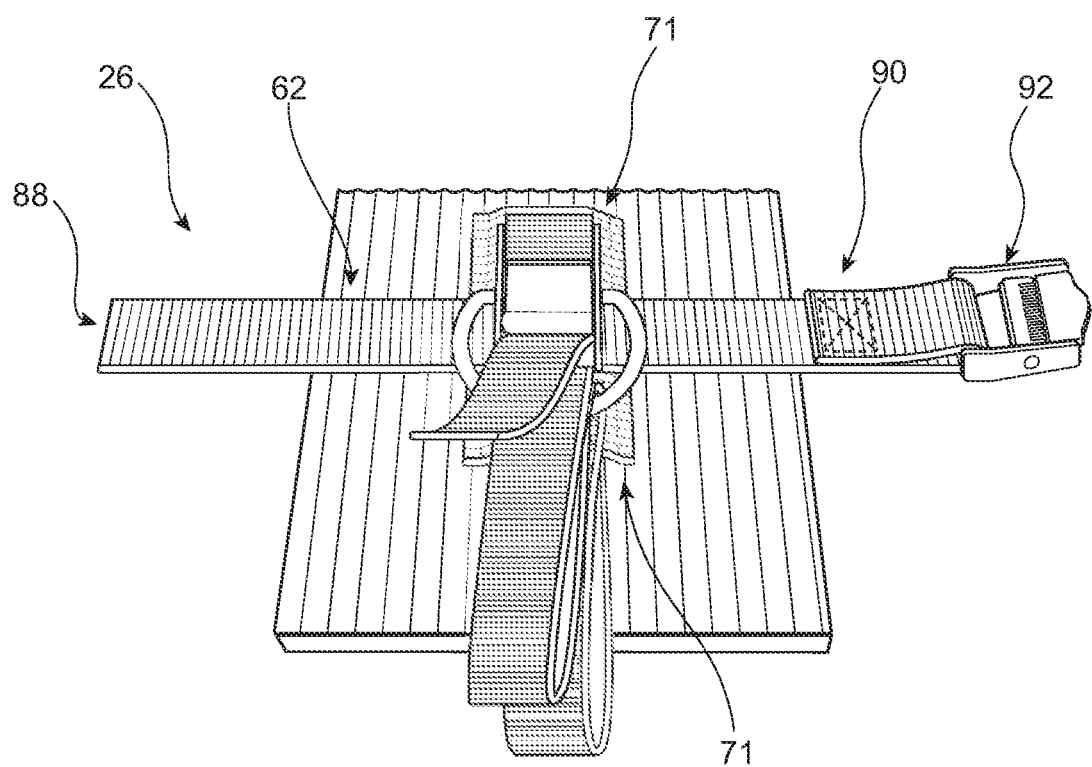
FIG. 11 is a perspective view of the mounting arrangement of FIG. 8 including a further embodiment of a securement strap.
Figure 12:
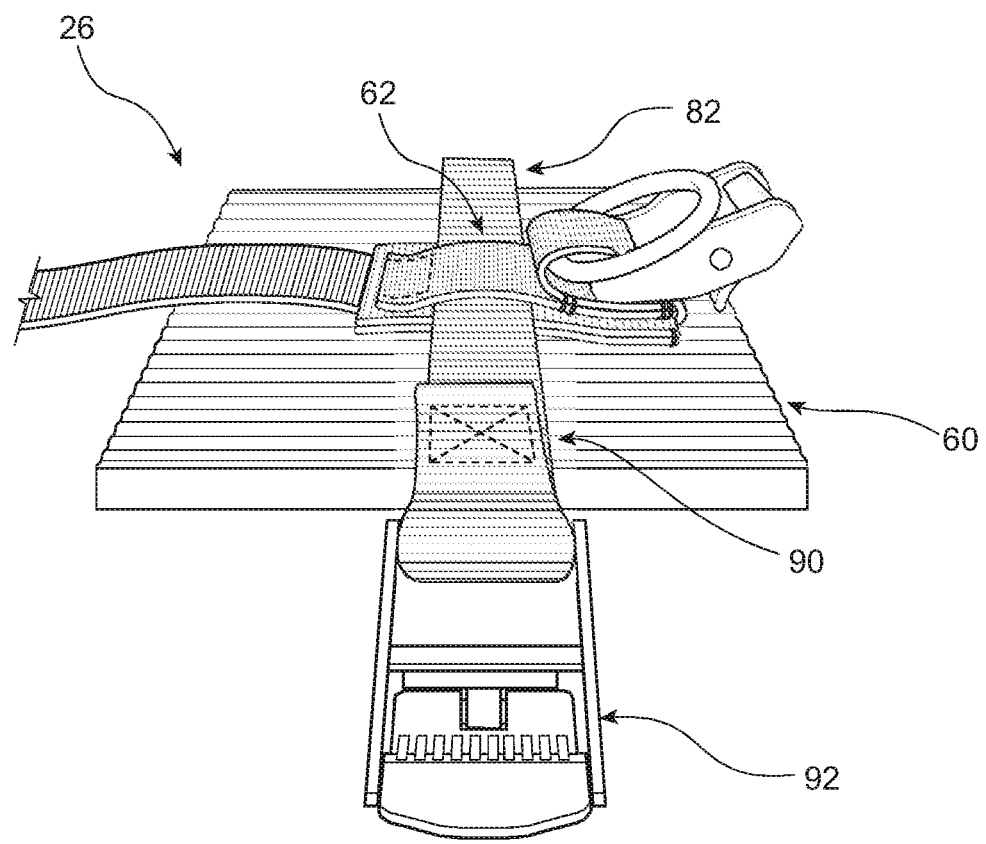
FIG. 12 is a perspective view of the mounting arrangement of FIG. 11.
Figure 13:
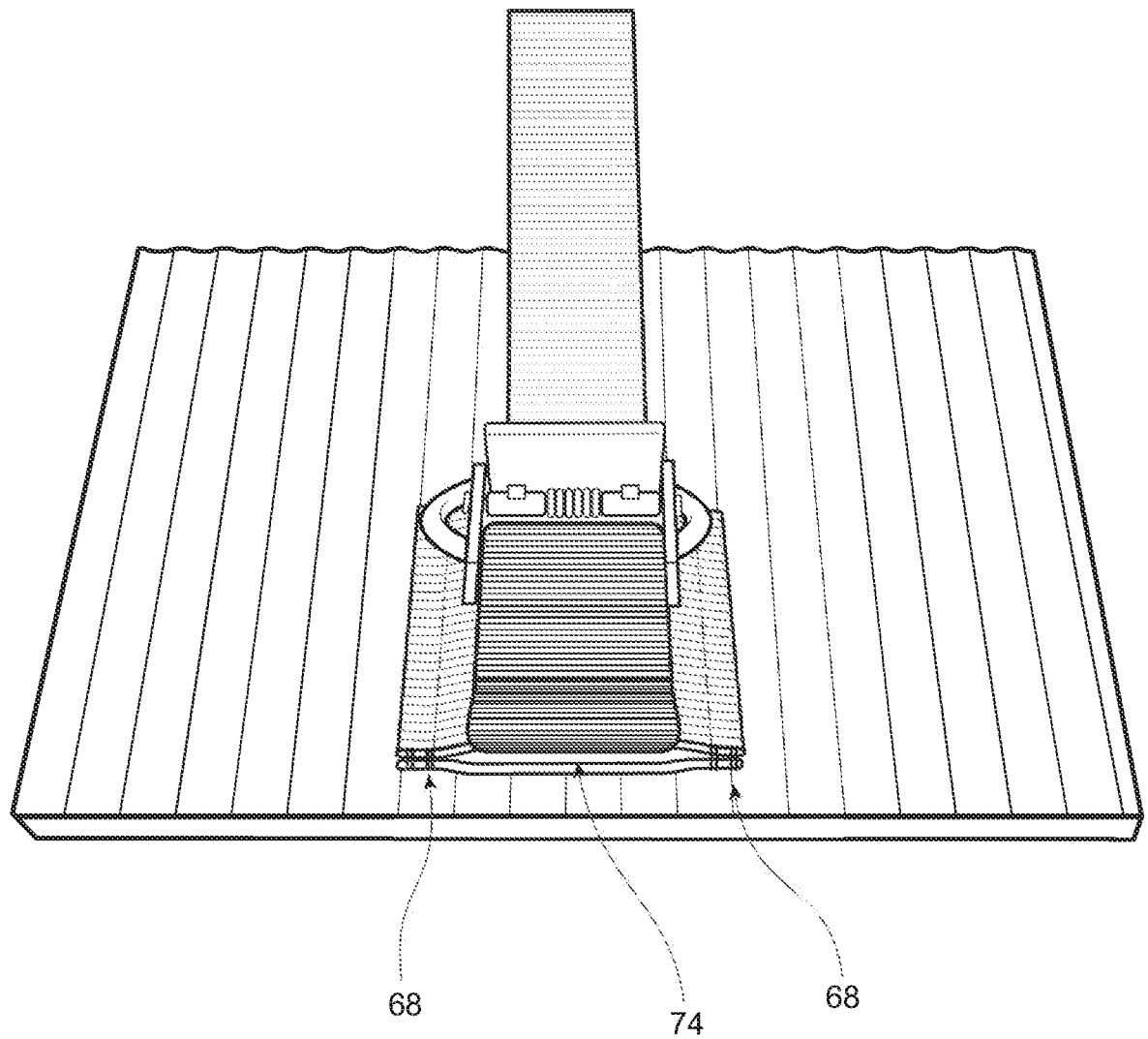
FIG. 13 is an end view of the mounting arrangement of FIG. 4.
Figure 14:
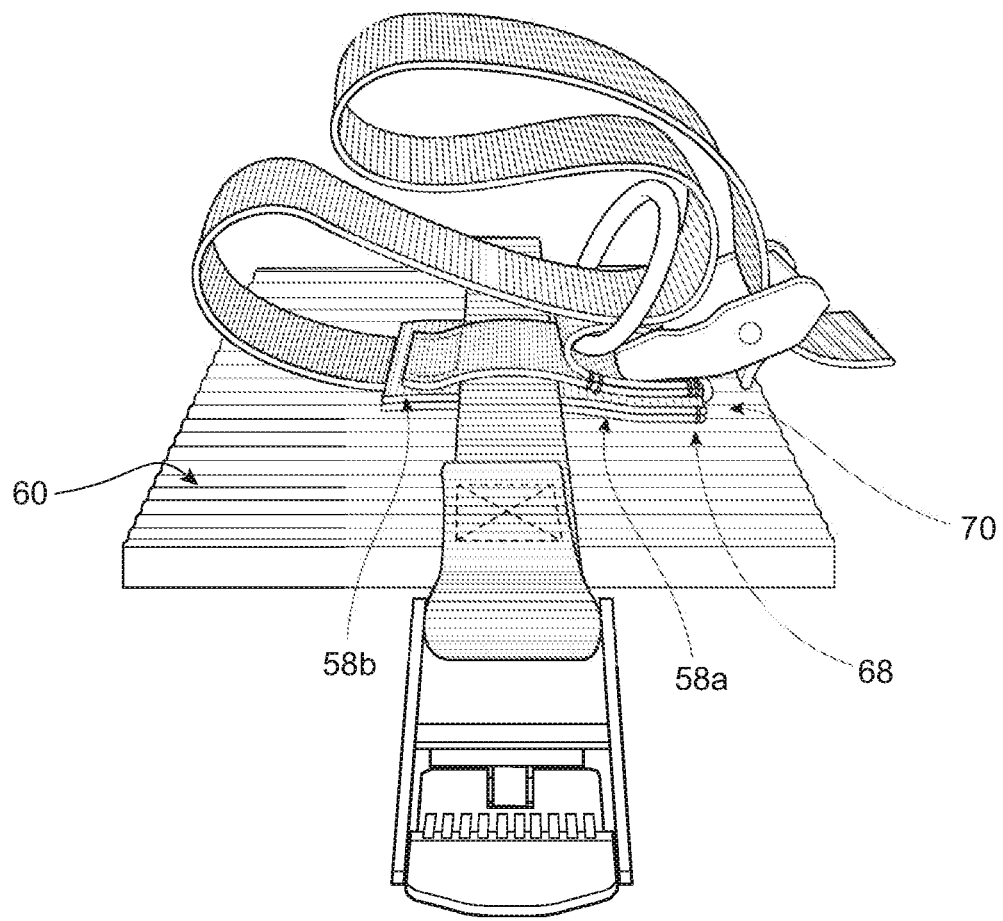
FIG. 14 is a side view of the mounting arrangement of FIG. 11.

The ring 46 allows the strap 28 to form at least one loop, and in the illustrated embodiment, two loops (as best shown in FIG. 6) which may be referred to as a twin-loop system 51. A first loop 52 is formed between the securable end 32 of the strap 28 and the ring 46. A second loop 54 is formed between the ring 46 and the free end 34 of the strap secured at the buckle 44. The twin-loop system 51 secures the recovery equipment 12 to the anchor system 26. In the illustrated embodiment (see FIG. 1), the first loop 52 extends through a centre 56 of the coiled recovery strap 14 and around the bow of the shackle 16. The second loop 54 extends around the pin 22 of the shackle 16. The twin loop system 51 prevents lateral movement of the shackle 16 and the unravelling of the coiled recovery strap 14. The releasable connector 30 on the front of the strap 28 allows secure storage in combination with the twin-loop system which pulls the shackle 16 tight when affixing the recovery equipment 12 to the vehicle 1.

In alternative non-illustrated embodiments, any number of loops may be formed depending on the recovery equipment. Additional rings may be included, no ring is required, or different sizes and shapes of rings may be included. For example, D Rings, square/rectangular rings, O rings. Further, the ring may be in any suitable form such as any mounting arrangement that retains a part of the strap relative to the mounting arrangement, for example a sleeve, slider, or adjuster.

Now referring to FIGS. 8 to 14, the anchor system 26 comprises one or more anchor straps 58, a mounting pad 60 and a securement strap 62. The one or more anchor straps 58 are coupled to the mounting pad 60. The mounting pad 60 acts as a base on which the other components of the mounting arrangement 10 are mounted. In the illustrated embodiment, the mounting pad 60 includes a front face 64 and a rear face. The rear face (not shown) is mounted in facing arrangement with the vehicle 1. The other components of the mounting arrangement are mounted to the front face 64 of the mounting pad 60.

The mounting pad 60 is formed of a non-abrasive material. In the illustrated embodiment, the mounting pad 60 is formed of polyvinyl chloride. In this way, the mounting pad 60 can also act as a cushion between the recovery equipment 12 and the front portion of the vehicle 1 thereby preventing damage to the vehicle. The mounting pad may also be made from any suitable materials such as plastic (PV) or rubber or foams that are non-abrasive. The non-abrasive material also prevents damage to the recovery equipment 12 (i.e. abrasion of the straps of the recovery equipment and to prevent some contact of the recovery equipment against the vehicle).

The anchor strap 58 of the anchor system 26 is secured to the mounting pad 60 at a plurality of peripheral points 68. In the illustrated embodiment, the anchor strap 58 is in the form of one or more elongate predetermined lengths of webbing that include opposing sides 66 and opposing ends 67. The anchor strap 58 is wider (i.e., has wider ends) and shorter than the strap 28 for retaining the vehicle recovery equipment 12. In this way, the one or more anchor straps 58 overlap a portion of the strap 28 but extends beyond the strap's width to be secured on each side of the strap 28 to the mounting pad 60.

In the illustrated embodiment, the overlaying anchors straps 58 are fixed (e.g. sewn) to one another and to the mounting pad 60 at the peripheral points 68 which include each corner 70, and in some embodiments, the peripheral points 68 include points along edges of the opposing sides 66 and ends 67. The peripheral points 68 may be spaced apart, or may be formed proximal one another to form a line. The bottom anchor strap 58a is fixed to the mounting pad 60 and the top anchor strap 58b is fixed to the bottom anchor strap 58a. In some embodiments, when the peripheral points 68 are spaced apart, they define a passage 74. In the illustrated embodiment, the top anchor strap 58a is sewn at each corner 70 of the opposing ends 67, a portion of each end 67 and along the opposing sides 66. The portion of each end 67 that is secured extends from the respective corner 70 to the edge of the strap. A longitudinal axis extends in the direction of the elongate strap and parallel with the opposing sides of the anchor strap. The passage 74 extends between the opposing ends 67 of the anchor straps 58 and between the top anchor strap 58a and the bottom anchor strap 58b in the direction of the longitudinal axis for receiving the securement strap 62. The securement strap 62 is configured to secure the mounting arrangement 10 to the vehicle (as shown in FIGS. 8 to 14). The passage 74 is open at the opposing ends 67.

The strap 28 also extends through the passage 74 between the top anchor strap 58a and the bottom anchor strap 58b. When the securement strap is received in the longitudinal passage 74, the securement strap 62 is positioned between the strap 28 and the mounting pad 60. This eliminates any interference or cross-over of the securement strap 62 and the strap 28. This enables each strap to be effectively tensioned to respectively retain the vehicle recovery equipment 12 and the mounting arrangement 10 to the vehicle 1.

In the illustrated embodiment, the anchor system 26 also includes a second anchor strap 76. The second anchor strap 76 overlays the anchor straps 58a, 58b and extends in the same longitudinal direction. The second anchor strap 76 is formed from a predetermined length of strap of a similar width to the strap and a narrower width than the one or more anchor straps 58. The second anchor strap 76 extends between opposing ends 78 and includes opposing sides 80. The second anchor strap 76 is fixed to the one or more anchor straps 58 at a plurality of peripheral points 82. For example, the second anchor strap 76 is fixed (e.g. sewn) at each corner 84, a portion of each side 80 and along each end 78. In this way, the peripheral points 82 are spaced apart to define a second passage 86 in a lateral direction to the longitudinal axis between the one or more anchor straps 58 and the second anchor strap 76. The second passage 86 may receive the securement strap 62 to secure the mounting arrangement 12 to the vehicle 1. The second passage 86 includes open ends and is fixed along the opposing sides 80 of the second anchor strap 76.

The second passage 86 may be substantially perpendicular to the passage 74. However, the second passage 86 is wider than the securement strap 62 and as a result, the securement strap 62 may extend at a range of angles to the longitudinal axis and does not need to extend perpendicular through the second passage 86.

As disclosed above, the strap 28 is secured to the anchor system 26. In the illustrated embodiment, the securable end 32 of the strap 28 is fixed to the end of both the one or more anchor straps 58 and the second anchor strap 76. The strap 28 forms the connector loop 38 including the releasable connector 30 and then forms the joint 40 with the one or more anchor straps 58 and the second anchor strap 76. The joint 40 is formed by the three straps being sewn together in line with the ends of the one or more anchor straps 58 and the second anchor strap 76. The joint 40 is not fixed to the mounting pad 60. From the joint 40, the strap 28 bends back on itself and underneath the one or more anchor straps 58 between the one or more anchor straps 58 and the mounting pad 60 to extend in the direction of the longitudinal axis and in the same direction as the anchor system. The free end 34 of the strap 28 extends out the other end of the one or more anchor straps 58 and the second anchor strap 76.

In the illustrated embodiment, the one or more anchor straps 58 is in the form of polyamide webbing. In non-illustrated alternative embodiments, the one or more anchor straps may be secured to the mounting pad by any suitable fastening arrangement such as other potential techniques of sewing/gluing/stapling etc or combination thereof. In non-illustrated alternative embodiments, one anchor strap is included and the first passage is formed directly between the anchor strap and the mounting pad. The second passage may also be formed directly between the anchor strap and the mounting pad.

Referring to FIGS. 8 to 14, the securement strap 62 is shown in two configurations relative to the anchor system 26. The securement strap 62 extends between a first end 88 and a second end 90. The first end 88 is threaded through one of the open ends of the passage 74 or the second passage 86. In some embodiments, two securement straps may be used, one for each passage. In non-illustrated alternative embodiments, the first and second passage may be formed between the same two surfaces and do not necessarily require separate surfaces or straps to form each passage. The operator will determine which passage 74, 86 will be the most effective depending on the part of the vehicle on which the mounting. The securement strap 62 allows the mounting arrangement 12 to be mounted directly to the body of the vehicle 1 using existing apertures on the body or around existing features such as bull bar loops, spare wheels or bumpers. The passage 74 and the second passage 86 are configured to be used independently or in combination depending on the predetermined mounting location on the vehicle.

The first end 88 of the securement strap 62 is also threaded through the part of the vehicle and the securement strap 62 extends around the part of the vehicle. The securement strap 62 also consists of a buckle 92 at the second end 90 of the securement strap 62. The securement strap 62 is threaded through an aperture of the buckle 92 and then the second end 90 is fixed to a part of the securement strap 62 proximal the buckle 92 to secure the buckle 92 at the end of the securement strap 62. The buckle 92 shown in the illustrated embodiment is a cam lock buckle. However, other alternative types of buckles/fastening mechanisms may be employed.

In the embodiment shown in FIG. 1, the first end 88 of the securement strap 62 is passed through the passage 74 of the anchor system 26 and extends around the bumper of the vehicle 1. The first end 88 is subsequently passed through and fastened to the cam lock buckle 92 located at the second end 90 thus forming a closed loop. Different length securement straps may be used, and the securement strap may be tensioned through the buckle and retained in the tensioned closed loop. A benefit of using such a configuration is that the closed loop formed by the securement strap can accommodate any shape or size of the portion of the vehicle around which the securement strap is fastened. This would allow it to be fastened around for example bull-bar loops or spare wheels. The size of the loop depends only on the length of the securement strap 62 and the part of the vehicle that the securement strap 62 extends around. In alternate embodiments, the securement strap may be a rope or other suitable fastening means. It is understood that any suitable securing strap provided it is able to maintain secure and effective attachment to the vehicle whilst travelling through rugged terrain, this can be commonly available straps provided they fit through the passage and the second passage.

Figure 15:
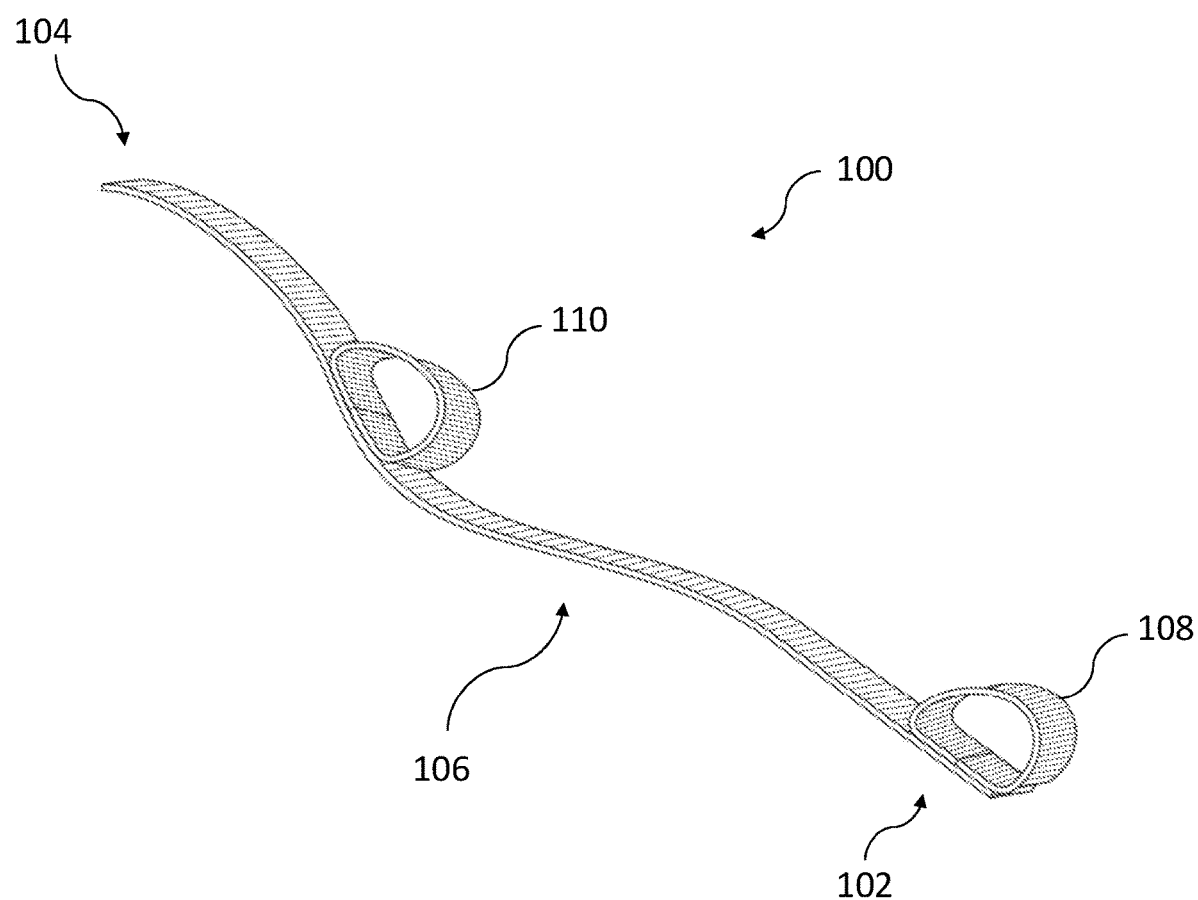
FIG. 15 is a perspective view of an embodiment of a deployment strap configured to be used with the embodiment of the vehicle recovery equipment of FIG. 1.
Figure 16:
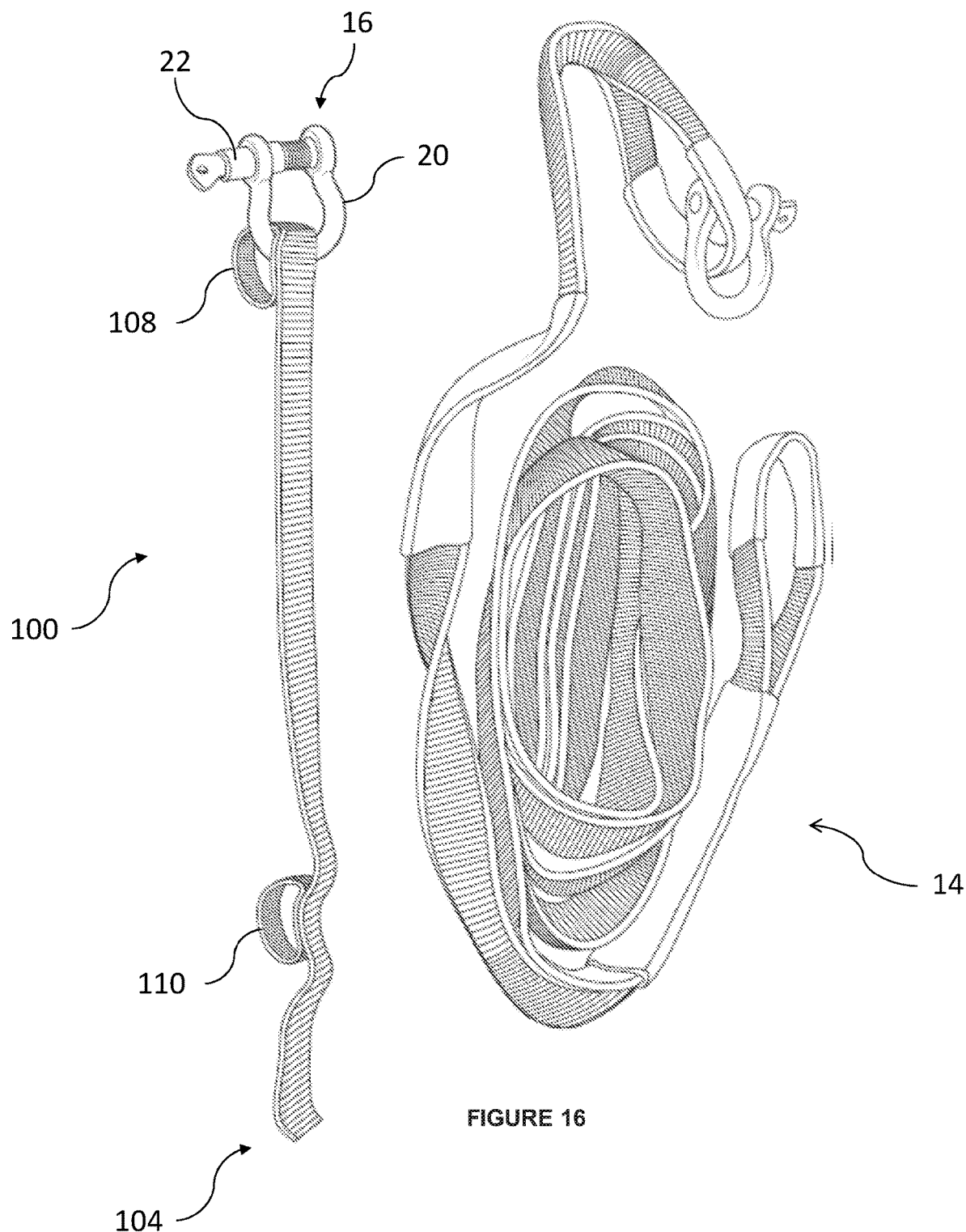
FIG. 16 is a perspective view of an embodiment of the deployment strap coupled to a part of the vehicle recovery equipment of FIG. 1.
Figure 17:
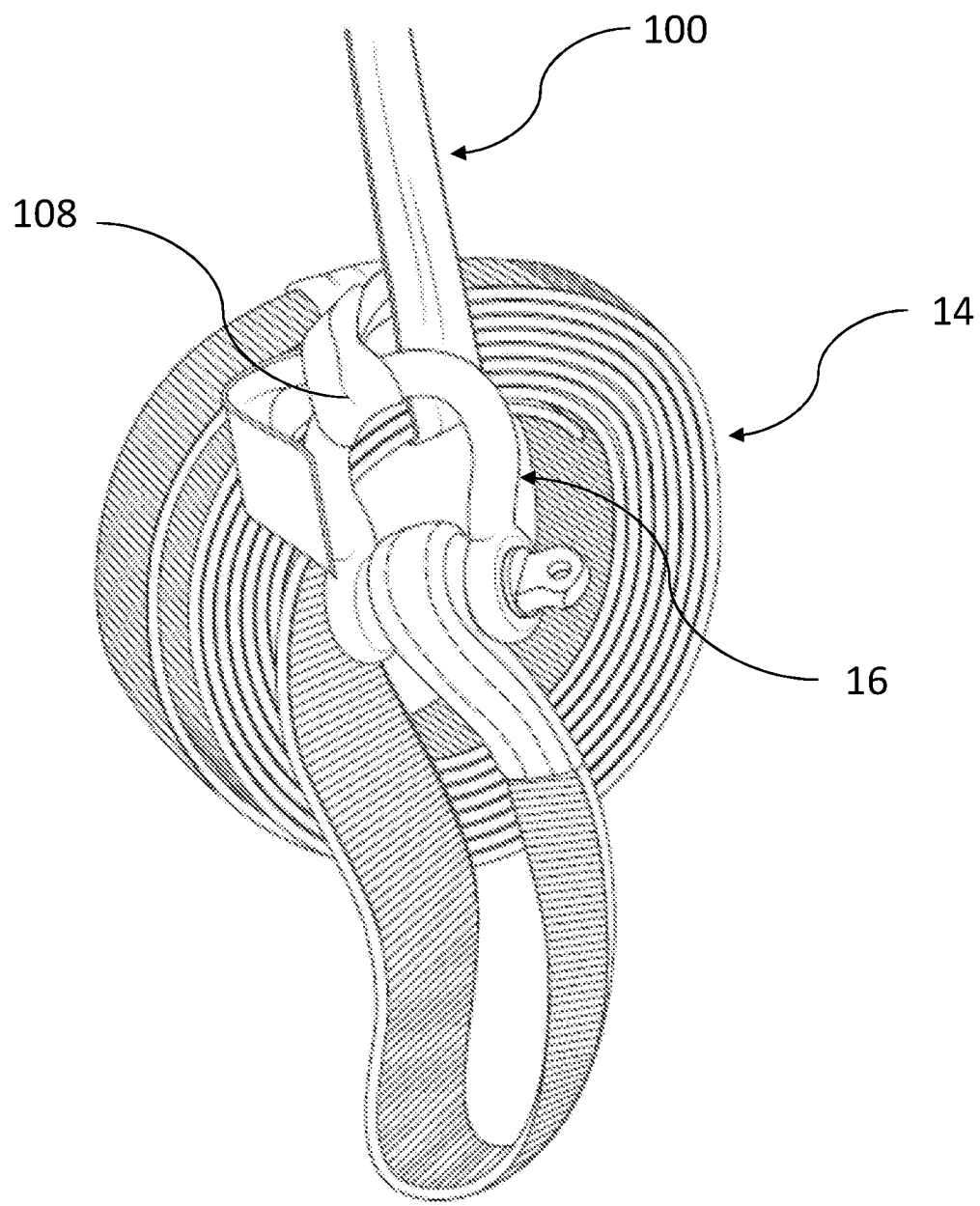
FIG. 17 is a perspective view of the deployment strap of FIG. 15 in use.

Now referring to FIGS. 15 to 17, a further embodiment of the mounting arrangement 10 is illustrated. In addition to the embodiments described above, this embodiment further includes a deployment strap 100. The deployment strap 100 facilitates disengagement of the vehicle recovery equipment 12 by making it easier for the user to at least partially release the strap 28 from the releasable connector to the deployed position. As discussed above, the strap 28 is secured to the releasable connector 30 in the retained position and a user releases the strap 28 from the releasable connector 30 by operating the release lever 50. The deployment strap 100 acts to provide increased leverage to the user loosening or releasing the strap 28. of.

In the illustrated embodiment, the deployment strap 100 extends between a first end 102 and a second end 104 and includes a coupling portion 106 located between the first and second ends. The coupling portion is configured to couple the deployment strap 100 to a portion of the strap 28. The coupling portion 106 is able to couple to a portion of the strap 28 such that when a force is applied to the deployment strap 100. The coupling provides leverage to facilitate applying a force to the strap 28.

The coupling portion 106 can take various forms. In the illustrated embodiment, the coupling portion 106 comprises a first loop 108 located at or proximal to the first end and a second loop 110 located between the first and second ends. The first and second loops are formed by reinforcing (e.g., stitching, adhesive, etc.) a length of a further strap to the deployment strap. The distance between the first and second loops can be 500 mm while the distance between the second end and the second loop can be around 150 mm. The total length of the looped section can be around 170 mm (70 mm being the length used to stitch/reinforce the loop section to the deployment strap). These lengths can be altered as desired to suit specific requirements (e.g. a larger coiled recovery strap, bigger shackles etc). The material used for the straps of these loops may be the same or different from the material used for the deployment strap.

In some embodiments, the first and second loops can be formed from the deployment strap 100 itself. For example, a portion of the deployment strap 100 can be formed into a loop using techniques similar to those used for forming a knot in a rope or through stitching, adhesive techniques. This would greatly simplify the cost and time required for fabrication of a deployment strap. For example, a user could utilize any strap having a suitable length that is available and form the loops themselves while mounting the vehicle recovery equipment to the vehicle.

In use, a user can pull the deployment strap 100 while attempting to release the strap 28 to the deployed position. The resulting tension force in the deployment strap 100 pulls on a portion of the strap 28 transferring the tension force to the strap 28 through the coupling portion 106. The transferred tension force overcomes a frictional force between the strap 28 and the releasable connector 30 thus causing it to at least partially release from the releasable connector 30. When the strap 28 is fully released from the releasable connector 30, the force applied to the deployment strap 100 overcomes frictional forces between the deployment strap 100 and the strap 28 causing relative movement between the strap 28 and the deployment strap 100 to the point of the release of strap 28 from the deployment strap 100.

In the illustrated embodiment, the coupling portion 106 connects the deployment strap 100 with the strap 28 at a region at or near the free end 34 of the strap 28. The free end 34 of the strap 28 is fed through the first loop to form the coupling portion before the free end 34 of the strap 28 is secured to the releasable connector Such an arrangement ensures that the strap 28 is in a state of tension on both sides of the coupling portion 106. This will facilitate effective transfer of force applied to the deployment strap 100.

The second end 104 of the deployment strap acts as the portion which can be gripped by a user and pulled.

The deployment strap 100 can also provide additional support to the coiled recovery strap 14 and the shackle 16 of the vehicle recovery equipment 12. For example, the first loop 108 can be coupled to the shackle 16 by feeding one of the aligned ears 20 of the shackle (as best shown in FIG. 16) through the first loop 108 of the deployment strap 100. Subsequently, the user can wind the section of the deployment strap 100 between the first and second loops around the coiled recovery strap 14 and the shackle thus bundling up the coiled recovery strap (note that in FIG. 17, the deployment strap is only wound around the coiled recovery strap after the loop 108 is coupled with the shackle. However, it would be apparent to a person skilled in the art to wind the deployment strap around the shackle 16 as well).

In the illustrated embodiment, the deployment strap is around 790 mm long although it will be apparent to the person skilled in the art to utilize other lengths as required. Similarly, the material of the strap can be chosen from as any material deemed suitable that could be natural or artificial, that can be fibrous, metal or otherwise that combines through weaving or other means to form a continuous length that will be manipulated during manufacturing as described above to form the deployment strap.

A method of using the deployment strap 100 of the illustrated embodiment will now be described with reference to FIGS. 16 and 17

1. Prior to connecting the pin 22 of the shackle, the first loop 108 of the deployment strap 100 is secured to the shackle such that it receives one of the aligned ears 22 of the shackle 16. The first loop 108 locates on the bow (U-shaped component) of the shackle.
2. Subsequently, the pin 22 is inserted and secured to the shackle 16 thereby preventing unintentional release of the first loop 108 of the deployment strap 100 from the shackle 16.
3. Next, the section of the deployment strap 100 between the first and second loops is wound around the coiled recovery strap 14 and the shackle 16 such that the portion of the deployment strap 100 comprising the second loop 110 and the second end 104 is received through the space formed between the pins 22 and the bow of the shackle 16 (Note that in FIG. 17, the deployment strap is being shown as only being wound around the coiled recovery strap 14 but it should be apparent to the person skilled in the art that the strap can be received through the void space in the shackle 16).
4. The free end 34 of the strap 28 is then received through the second loop 110 of the deployment strap 100 before being secured to the releasable connector 30. Thus, the second end 104 of the deployment strap 100 will be freely accessible to the user.
5. During deployment of the vehicle recovery equipment 12, a user will first activate the release lever 50 of the releasable connector 30 thus partially releasing the strap 28.
6. Next, the user, while holding the release lever 50 in the open position, can pull the second end 104 of the deployment strap 100 to further disengage the strap 28 from the releasable connector 30. Once the strap 28 is fully free from the releasable connector 30, the free end 34 of the strap 28 will automatically be released from the second loop 110 of the deployment strap 100.
7. Subsequently, the portion of the deployment strap between the first and second loops that is wound around the coiled recovery strap 14 and the shackle 16 can be unwound to fully deploy the coiled recovery strap 14.

Using the mounting arrangement as shown in the Figures, when a vehicle requires recovering, the operator depresses the release lever of the cam lock fastener and pulls the releasable fastener away from the vehicle holding the recovery equipment with one hand while holding the release on the fastener with the other.

The mounting arrangement 12 disclosed herein and illustrated in the drawings effectively and efficiently releases pre-deployed vehicle recovery equipment to lower the recovery time of a vehicle that is stuck in adverse terrain. The mounting arrangement 12 does not need to be removed from the vehicle when not in use as long as the strap is secured back through the cam lock fastener.

Some advantages of the mounting arrangement 12 and method of securing the vehicle recovery equipment to the vehicle are as follows:

A storage point of recovery straps mountable various positions on vehicle that is able to be securely fastened. This facilitates the recovery straps being accessible from the most advantageous point on the vehicle for the given recovery being undertaken.

The mounting arrangement is separately secured to vehicle therefore movable as required.

The recovery equipment (e.g., ropes/winches/straps) are securely stored on an easily accessible part of the vehicle that is easily deployable during a recovery.

The releasable connector only requires single point of contact release to give allow the mounting arrangement to be in a deployed position. This provides fast access to the stored recovery equipment in a recovery situation.

The twin-loop system employed enables single point of contact release, while providing secure mounting of the vehicle recovery equipment through more than one point of contact of the mounting arrangement on the recovery equipment.

Single point of contact release of the cam lock fastener using the twin loop system allows the non-contact hand to retrieve the recovery equipment being released. Therefore, lowering deployment time of recovery equipment if used correctly.

The mounting arrangement has applications in four-wheel drive vehicles and rugged environments but is not restricted to use in such environments and can be used for storage with any vehicle.

If a vehicle does not require the use of the recovery equipment, the mounting arrangement may also be a short-term storage option whilst travelling, whilst still using the twin loop system as the method of storage. The mounting arrangement may be mounted to the vehicle with the vehicle recovery equipment already mounted to the mounting arrangement.

Variations and modifications may be made to the parts previously described without departing from the spirit or ambit of the disclosure.

For example, the buckle and the ring of the releasable fastener may be replaced with a moulded plastic piece that can perform the function of the ring and the cam lock fastener of the buckle which integrates partially or wholly with the two-configuration securement arrangement (i.e., the securement strap position relative to the anchor system that attaches the mounting arrangement to the vehicle).

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A vehicle recovery equipment mounting arrangement for securing vehicle recovery equipment to a vehicle, the mounting arrangement comprising:
   an anchor system configured to be coupled to a vehicle;
   a strap extending between a securable end and a free end, the strap being secured to the anchor system proximal to or at the securable end; and
   a releasable connector attached to or proximal the securable end of the strap for securing toward or proximal the free end of the strap, and
   an attachment member secured to the anchor system attached to or proximal the securable end of the strap for defining at least one loop of the strap extending around a part of the vehicle recovery equipment,
   wherein the attachment of the releasable connector and the attachment member include degrees of movement to allow the releasable connector and the attachment member to extend relative to the anchor system at a range of angles independent of one another
   wherein, when the mounting arrangement is in a retained position, the strap being arranged to extend around at least a part of the vehicle recovery equipment to retain the vehicle recovery equipment to the vehicle and the free end of the strap is secured to the releasable connector; and
   when the mounting arrangement is in a deployed position, the releasable connector is released to loosen the strap to deploy the vehicle recovery equipment.

2. A vehicle recovery equipment mounting arrangement according to claim 1, wherein the releasable connector includes a buckle releasably connectable to the free end of the strap.

3. A vehicle recovery equipment mounting arrangement according to claim 1, wherein the securable end of the strap is threaded through the releasable connector to attach the releasable connector to the anchor system.

4. A vehicle recovery equipment mounting arrangement according to claim 1, wherein the anchor system is reconfigurable to be mounted to a plurality of different parts of the vehicle.

5. A vehicle recovery equipment mounting arrangement according to claim 1, wherein the attachment member defines the strap into two loops, and a first loop extends around a part of the vehicle recovery equipment and a second loop extends around a further part of the vehicle recovery equipment.

6. A vehicle recovery equipment mounting arrangement according to claim 5, wherein the strap is extended through the attachment member secured to the anchor system to define a first loop of the strap extending around the part of the vehicle recovery equipment and the strap from the attachment member is further extended around a further part of the vehicle recovery equipment to define a second loop of the strap and the free end of the strap is secured at the releasable connector.

7. A vehicle recovery equipment mounting arrangement according to claim 1, wherein the anchor system includes one or more anchor straps fixed to a mounting pad, and the one or more anchor straps are at least secured to the mounting pad at a plurality of peripheral points.

8. A vehicle recovery equipment mounting arrangement according to claim 7, wherein the mounting pad includes a rear face that is mountable in facing arrangement with the vehicle.

9. A vehicle recovery equipment mounting arrangement according to claim 7, wherein the mounting pad is non-abrasive to prevent damage to the vehicle when the anchor system is coupled to the vehicle.

10. A vehicle recovery equipment mounting arrangement according to claim 7, wherein the plurality of secured peripheral points are spaced apart to define a passage in at least one direction, and the mounting arrangement further comprises a securement strap extending through the passage to secure the mounting arrangement to the vehicle.

11. A vehicle recovery equipment mounting arrangement according to claim 10, wherein the anchor system further comprises a second anchor strap fixed to the one or more anchor straps at a plurality of peripheral points to define a second passage in at least one direction at an angle to the at least one direction of the passage for receiving the securement strap to secure the mounting arrangement to the vehicle.

12. A vehicle recovery equipment mounting arrangement according to claim 11, wherein the second passage is substantially perpendicular to the passage.

13. A mounting arrangement for securing vehicle recovery equipment to a vehicle, the mounting arrangement comprising:
   an anchor system configured to be coupled to a vehicle;
   a strap being movable relative to a releasable connector between a retained position and a deployed position, wherein in the retained position, the strap extends around at least a part of the vehicle recovery equipment to retain the vehicle recovery equipment to the anchor system, and in a deployed position, the releasable connector is configured to at least partially release the strap to disengage the vehicle recovery equipment; and
   a deployment strap configured to facilitate the disengagement of the vehicle recovery equipment to apply a force to a part of the strap to facilitate at least partial release of the strap relative to the releasable connector to the deployed position.

14. A mounting arrangement according to claim 13, wherein the deployment strap extends between a first end and a second end and includes a coupling portion located between or at the first end and second end configured to couple with the at least a part of the strap, and wherein, when the releasable connector is released, a force is applied to the second end of the deployment strap to at least partially release the strap from the releasable connector to deploy the vehicle recovery equipment.

15. A mounting arrangement according to claim 14, wherein the coupling portion of the deployment strap comprises a first loop, the first loop being located at or proximal to the first end, and the coupling portion further comprises a second loop located between the first end and the second end wherein the first loop is coupled to at least part of the vehicle recovery equipment and the second loop receives the strap.

16. A method of mounting vehicle recovery equipment to a vehicle, the method including:

coupling an anchor system of a mounting arrangement to the vehicle, the mounting arrangement including a strap extending between a free end and a securable end, the securable end is fixed to the anchor system;

extending the free end of the strap around at least a part of the vehicle recovery equipment to retain the part of the vehicle recovery equipment;

extending the strap through an attachment member secured to the anchor system to define a first loop of the strap extending around the part of the vehicle recovery equipment;

extending the strap from the attachment member around a further part of the vehicle recovery equipment to define a second loop of the strap and securing the free end of the strap at a releasable connector, wherein the first loop and the second loop secure the vehicle recovery equipment to the mounting arrangement by providing balanced and tensioned points of contact relative to the recovery equipment.

17. A method according to claim 16 further comprising coupling the strap with a deployment strap configured to facilitate disengagement of the vehicle recovery equipment prior to securing it to a releasable connector, wherein the first loop and the second loop secure the vehicle recovery equipment to the mounting arrangement by providing balanced and tensioned points of contact relative to the recovery equipment.

* * * * *